June 2, 1931.  C. H. NORTON  1,807,701
BEARING
Filed March 8, 1930
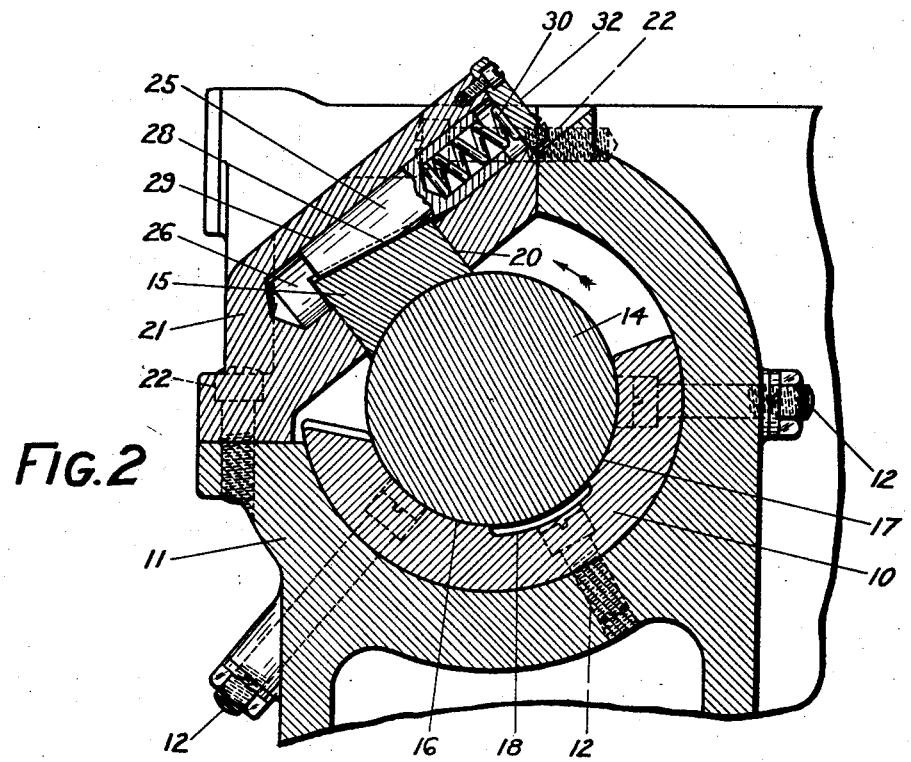
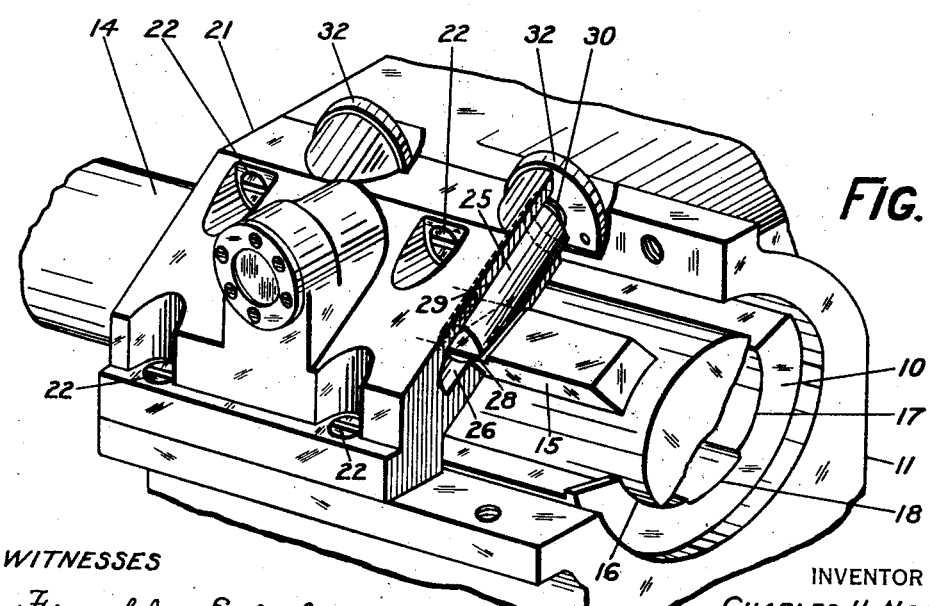
WITNESSES
Franklin E. Johnson
Dayl M. Hoyt
INVENTOR
CHARLES H. NORTON
BY Clayton R. Jenks
ATTORNEY Patented June 2, 1931

1,807,701

UNITED STATES PATENT OFFICE

CHARLES H. NORTON, OF PLAINVILLE, CONNECTICUT, ASSIGNOR TO NORTON COMPANY, OF WORCESTER, MASSACHUSETTS, A CORPORATION OF MASSACHUSETTS

BEARING

Application filed March 8, 1930. Serial No. 434,261.

This application is a continuation in part of applicant's prior case Serial No. 53,806.

This invention relates to a bearing and more particularly to an automatically adjustable spindle bearing construction for supporting a rapidly rotating grinding wheel spindle.

It has been found by practical experience that the standard bearing constructions which are useful for ordinary types of machines will not be wholly satisfactory in a precision grinding machine for supporting the grinding wheel spindle. For example, one type of bearing comprises a tapered member provided with radial slots so arranged that by moving it endwise the inner bearing surface is expanded or contracted to adjust it to the spindle surface. Such a bearing involves an inherent defect in that the bearing member cannot be readily adjusted while the spindle is hot and rotating under operating conditions.

In accordance with my prior Patent No. 1,443,925 I have heretofore provided a grinding wheel spindle bearing made up of a fixed lower half-bearing member and two freely movable floating shoes which are held under a screw adjusted pressure against the spindle. As originally constructed, one of the floating shoes was arranged diametrically opposite one end of the fixed bearing and the other shoe against the other end of the fixed bearing so that these four bearing portions constituted what may be termed a four point support for the spindle. Since a body cannot be properly supported on four points without requiring fine adjustments of the various parts, it has been found necessary to adjust the floating bearing shoes with great care in the use of such a construction. If in actual practice one of these shoes is adjusted a little more tightly against the spindle than the other, then there is a tendency for both the tightly adjusted shoe and the fixed bearing to wear at diametrically opposite points. This results in a corresponding looseness of the other two bearing portions and the tendency will be for the spindle to vibrate laterally between the looser bearings, and any tightening up of the bearings does not compensate for this out of round condition. Vibration, even to a very slight extent, is extremely objectionable in a grinding machine, since it is transmitted to the grinding wheel and so causes chatter marks or other detrimental effects to appear on the surface of the work being ground or polished.

The adjustment of a bearing is ordinarily left to the judgment and skill or the wishes of the grinding machine operator, who often has no great knowledge of such mechanical problems. Because of that, I have provided the machine of my prior Patent No. 1,443,925 with small thumb screws for adjusting the bearing shoes, and assumed that the operator would merely tighten these bearing shoes with such power as lay within his fingers and that he would not tighten them enough to set the bearings. As a matter of fact, it has been found that the operator frequently uses an implement to tighten these bearing shoes, thinking that the tighter he gets the shoes the less liability there will be for the formation of chatter marks. Consequently, he creates conditions which eventually result in chatter marks appearing on the work.

It is accordingly the object of my invention to overcome such difficulties and to provide an improved bearing construction which will be highly serviceable for use with a grinding wheel spindle in a precision grinding machine, and in which the adjustment for wear of the bearing surfaces is taken care of automatically and does not depend on the skill or judgment of the operator.

A further object of this invention is to provide a self-adjusting bearing which is so constructed that it is practically impossible for the operator to adjust it manually, and which is automatically maintained in a correct condition at all times in its service.

A further object of the invention involves utilizing the principle of a three point support, the provision of three bearing surfaces for a spindle and means for adjusting the bearings to hold them in correct relation to the spindle during use.

In accordance with my invention I provide a bearing, which is particularly adapted for supporting a grinding wheel spindle in a precision grinding machine, comprising essentially a fixed bearing member of such shape that it constitutes the primary support for the bearing and which is so located as to receive the resultant thrust of usage. This bearing preferably comprises two spaced bearing surfaces located on opposite sides of a resultant line of pressure set up in normal use of the spindle which form what may be termed a two point support. Cooperating with the fixed bearing surfaces is a floating shoe which is arranged to move toward and from the spindle, and this shoe preferably contacts with a small portion of the spindle surface at a point substantially diametrically opposed to the space between the two fixed bearing surfaces, or it is otherwise so located that it will serve with the other two members to make a proper three point bearing for the spindle.

In order that the bearings may be self-adjusting, a follow up device is provided to hold the shoe firmly in contact with the spindle as the bearings wear and to prevent outward movement thereof. This may comprise a follow-up member, such as a locking pin arranged to move in a guide way so that it will contact with an outer surface of the floating shoe, and the parts are so constructed and arranged that this locking pin is biased for movement inwardly to maintain a firm contact with the floating shoe and thereby hold it in proper contact with the spindle. This biased movement may be obtained either by so arranging the guide way for the locking pin and the associated parts that the pin will move downwardly under the influence of gravity or it may be moved in its guide way by means of a spring or other suitable device which acts automatically to give a desired and preferably a substantially constant pressure on the pin, thus tending to urge it to a locking position. As a further feature of the invention I preferably so arrange the parts that the locking pin is not normally accessible for manual adjustment by the operator and the device therefore cannot be tampered with or the bearings made too tight during their running operation.

Referring now to the drawings which illustrate one embodiment of this invention:

Fig. 1 is an isometric view, partly broken away, of a bearing for a grinding wheel spindle; and Fig. 2 is a vertical section thereof.

The bearing illustrated in the drawings is particularly applicable for service as one of the bearing supports of a grinding wheel spindle which are arranged on opposite sides of the driving pulley, as shown in my prior Patent No. 1,443,925, although it will be apparent that this bearing is of general utility in many fields.

As illustrated, the bearing comprises a fixed bearing member 10 made of suitable material, such as bronze or bronze lined with babbitt, which is suitably mounted in the casing 11 in proper alignment with the true spindle axis and held immovable by means of the bolts 12, the heads of which are countersunk in the bearing member. This bearing member provides an extensive partial cylindrical surface which is the sole locating support for the grinding wheel spindle 14 under the normal conditions of usage. In order to prevent vibration of the spindle and to hold it correctly seated in this bearing suport, a floating bearing shoe 15 is mounted on the opposite side of the spindle from the fixed bearing member and means is provided for holding the shoe against vibratory movement.

The surface of the lower bearing member 10 serves as a two point bearing support opposed to the third support formed by the shoe 15 and I prefer that this member be so shaped as to provide two partial cylindrical surfaces 16 and 17 separated by a space 18 which may be formed simply by cutting a groove lengthwise of the bearing member 10 as illustrated. This space 18 is preferably located in the line of the resultant forces due to the belt pull, the grinding wheel thrust, etc. during the operation of the machine, it being noted that the spindle rotates in the direction of the arrow in Fig. 2 and that the belt pull is downward and to the right. The floating bearing shoe 15 is preferably located substantially diametrically opposite to this space 18, so that the shoe 15 and the two bearing surfaces 16 and 17 will form an adequate three point support for the grinding wheel spindle. It is to be observed that the lower bearing member 10 is substantially a half bearing with an extensive surface in contact with the spindle which is adequate to hold the spindle in position, even when running. On the other hand, the shoe 15 is a long narrow block which does not need to have a large area of contact with the spindle, since its sole function is that of steadying the spindle in the lower bearing support.

In order to insure that the floating bearing shoe 15 remains always in proper contact with the grinding wheel spindle and holds the latter in correct position in the lower fixed bearing member, I have provided a construction in which the upper bearing shoe is automatically adjusted in its position as the bearings wear but cannot vibrate or permit vibration of the spindle. To this end, I provide a locking device which is biased to permit inward movement of the floating bearing shoe but will prevent its moving outwardly, and this device may also serve to impress sufficient pressure on the shoe to keep the oil film of the right thickness.

As illustrated, the bearing shoe 15 is slidably mounted in a guide way 20 formed as a groove in the removable casing member 21 which is suitably secured to the base 11, as by means of cap screws 22. The guide way 20 has parallel walls into which the parallel sides of the floating shoe 15 fit properly so that it may be aligned with the spindle and slide toward and from it but is held against lateral movement. Hence, under the influence of gravity or of a positively impressed pressure, this floating bearing shoe 15 will move downwardly in its guide way as the spindle wears or when for any other reason the bearing becomes loose.

This floating bearing shoe is held in its self-adjusted position by means of a locking pin 25, and in the present illustration by two locking pins which engage the long bearing shoe adjacent its opposite ends. Each of these locking pins is a cylindrical body slidably mounted in a cylindrical guide way 26 formed by drilling a hole in the casing cover 21. This pin is provided with a tapered surface 28 contacting with the upper surface of the floating bearing which is beveled to correspond therewith. As illustrated, the line of thrust from the center of the spindle outwardly through the center of the floating bearing will make substantially a right angle with the center line of the locking pin, and the rear wall of the locking pin guide way, represented by the line 29, makes a very acute angle with the plane of contact between the beveled face 28 of the locking pin and the floating bearing so that the outward pressure on the floating bearing will not force the locking pin outwardly. In other words, the pin serves as a wedge engaging the upper face of the floating bearing and the thrust thereagainst is absorbed by the upper wall surface 29 of the guide way 26 so that when the pin moves inwardly it wedges the floating bearing in position against the grinding wheel spindle.

A definite and predetermined pressure is preferably applied to this locking pin so as to hold the floating bearing against the grinding wheel spindle with sufficient force to provide an oil film of substantially the same thickness as that of the oil film between the spindle and the lower bearing surfaces. To this end, a spring 30 is mounted within a depression in the upper end of the locking pin 25. One end of the spring engages the pin and the other end is held by means of the cap plate 32 which is suitably fastened as by means of cap screws to the casing and forms a closure over the hole 26. In this way, a compression spring 30 of suitable strength is used to exert a uniform pressure always downwardly on the locking pin 25 and so hold the bearing shoe 15 firmly against the spindle with sufficient pressure to provide an oil film of the required thickness and yet not enough to stick the spindle. In other words, the locking pin is biased towards a locking position which steadies and properly supports the grinding wheel spindle.

It will therefore be seen that in accordance with this construction I have provided a self-adjusting bearing which is so constructed that the parts will be maintained always in a correct position relative to the spindle. No one bearing can be tampered with by the operator of the machine and made too tight relative to the others and so be brought into an out of round condition, but the bearings will all wear uniformly and will be maintained in cylindrical shape throughout a long life of useful service. It will also be understood that the bearing is to be oiled in any suitable manner, such as is shown in my prior patent, and that the other features of the prior patented construction may be incorporated with this special bearing if desired. It will also be appreciated that various mechanically equivalent devices may be substituted for the locking pin herein described so as to provide a self-adjusting bearing, the essential feature of the invention being the floating bearing and a follow up device which permits the shoe to move only inwardly towards the spindle, hence the claims are to be interpreted accordingly.

Having thus described my invention, what I claim as new and desire to secure by Letters Patent is:

1. A spindle bearing comprising a fixed bearing member constituting the sole locating bearing for a spindle which sustains the radial thrust of the spindle under the normal conditions of usage, a floating bearing shoe serving to hold the spindle properly against the fixed bearing member, means to prevent lateral movement of the shoe, a follow up member contacting with and freely movable towards the floating shoe, and self-adjusting means cooperating with said member to bias it towards movement into firm contact with the shoe, said member and floating shoe being so arranged that the shoe may move only inwardly towards the spindle.

2. A self-adjusting bearing, comprising a fixed bearing member constituting the sole locating bearing for a spindle which sustains the radial thrust thereof under the normal conditions of usage, a floating bearing shoe serving to hold the spindle properly against the fixed bearing member, means to prevent lateral movement of the shoe, and a self-adjusting follow-up device, including a movable locking member biased towards movement into firm contact with the shoe and means supporting said member against the thrust of the spindle and preventing the shoe from moving outwardly, which serves to hold the spindle seated correctly on the fixed bearing member and prevent vibration thereof.

3. A self-adjusting bearing for a spindle comprising a fixed lower bearing member constituting the sole locating bearing for the spindle which sustains the radial thrust thereof under the normal conditions of usage, a floating bearing shoe serving to hold the spindle properly against the fixed bearing member, means preventing lateral movement of the shoe, and a self-adjusting device, including a locking pin which is biased towards movement into contact with the shoe and a guideway for said locking pin, which follows up the inward movement of the shoe, the contacting surfaces of the shoe, the locking pin and the guideway being arranged at such angles that the pin may move only into firm contact with the shoe and prevent outward movement thereof and so keep the spindle correctly seated in said fixed bearing member.

4. A spindle bearing comprising a lower fixed bearing member arranged as the sole locating and supporting bearing for the spindle, a floating shoe freely movable towards and maintained in engagement with a small portion of the upper part of the spindle, means to prevent lateral movement of the shoe, a locking pin, means forming a guide way for the pin, and positively acting means which biases the pin towards an inward movement and firm engagement with the shoe, said guide way, pin and floating shoe having their contacting surfaces arranged at such angles that the pin may move only inwardly and prevent the shoe from moving outwardly under the spindle pressure, whereby the floating shoe moves only to take up any play and so holds the spindle correctly in position in the fixed bearing.

5. A spindle bearing comprising a member providing two fixed surfaces arranged as the sole locating bearing for the spindle and which normally sustain the radial thrust thereof, a floating shoe on the opposite side of the spindle from said members which forms therewith a three point bearing, a locking pin for the shoe, and means including a guide way tending to bias the pin towards an inward movement and into firm contact with the shoe, said guide way, pin and shoe having their contacting surfaces arranged at such angles that the pin may move only inwardly under the influence of said bias and thereby prevent the shoe from being moved outwardly by the spindle pressure, whereby the floating shoe serves to take up all wear and to hold the spindle properly located on the two fixed bearing surfaces.

6. A spindle bearing comprising a member provided with two fixed surfaces serving as the sole locating bearing for the spindle under the normal conditions of spindle use, a floating shoe cooperating therewith to form a three point support for the spindle, means guiding the shoe for movement towards and from the spindle, a locking pin, means forming a guide for the pin, and positively acting means forcing the pin under a uniform pressure into locking engagement with the shoe, the effective surfaces of the guide way, pin and shoe being arranged at such angles that the pin tends to move only towards the shoe and to prevent outward movement thereof, whereby any vibration of the spindle is dampened.

7. A spindle bearing comprising a casing, a spindle supporting member fixedly mounted on the casing and providing two partial cylindrical surfaces which constitute the sole locating bearing for the spindle under normal conditions of usage, said bearings being located on opposite sides of the resultant line of pressure thereon during a normal use of the spindle, a single floating bearing shoe substantially diametrically opposed to the space between said bearing surfaces and forming with said bearing surfaces a three point support for the spindle, and means including a self-adjusting follow up wedge block for holding the floating bearing shoe always in firm contact with the spindle and preventing outward movement of the shoe so as to prevent vibration and to seat the spindle correctly on the fixed bearing surfaces.

8. A spindle bearing comprising a bearing member provided with two fixed spaced bearing surfaces serving as the sole locating bearing for the spindle under the normal conditions of spindle usage, a single floating bearing shoe which contacts with the spindle substantially diametrically opposed to the space between said bearing surfaces, said bearing surfaces and shoe forming a three point support for the spindle, a guide way for the shoe which permits inward movement thereof, a follow up pin having a thin wedge shaped portion engaging the outer face of the bearing shoe, a casing wall providing a thrust receiving surface for the pin, and a spring exerting a force tending to move the locking pin inwardly and thereby hold the floating shoe with a proper pressure against the spindle, said parts being so constructed and arranged that the bearing shoe and the locking pin may not move outwardly under the forces set up during rotation of the spindle.

9. A spindle bearing comprising a fixed two point member constituting the sole locating bearing for a spindle, a floating bearing shoe forming therewith a three point support for the spindle, means forming a guide way for the shoe, a slidable locking pin contacting with the shoe, means forming a guide way for the pin, means acting automatically to urge the pin inwardly, and means concealing the bearing parts which prevents manual adjustment thereof, said locking pin, shoe and guide ways being so shaped that the pin follows up any inward movement of the shoe and holds it firmly against the spindle.

10. A spindle bearing comprising a fixed bearing member constituting the sole locating bearing for a spindle which sustains the radial thrust of the spindle under normal usage, a floating bearing shoe, means preventing lateral movement of the shoe which permits it to move towards the spindle, a locking member biased to follow up the inward movement of the shoe and prevent outward movement thereof, and means which normally prevents manual adjustment of the bearings.

11. A bearing for a grinding wheel spindle comprising a lower fixed bearing member arranged to serve as the sole locating bearing for the spindle, a floating bearing shoe maintained in engagement with a small portion of the upper part of the spindle to steady the same, means to hold the shoe from lateral movement, a locking pin mounted above the shoe and biased towards movement inwardly so as to maintain firm contact with and follow up any inward movement of the shoe, a guideway for said locking pin, the contacting surfaces of the shoe, the pin and the guideway being arranged at such angles that the pin may move only to maintain contact with the shoe and cannot move outwardly and so keeps the spindle firmly seated on the lower bearing member, and means including a removable closure permitting access to the locking pin but normally preventing manual adjustment thereof.

Signed at Plainville, Connecticut, this 6th day of March, 1930.

CHARLES H. NORTON.